US010768346B2

(12) United States Patent
Miner et al.

(10) Patent No.: US 10,768,346 B2
(45) Date of Patent: Sep. 8, 2020

(54) OPTICAL BEAM STEERING DEVICES HAVING POLYGONAL REFLECTORS THEREIN

(71) Applicant: Mirada Technologies Inc., San Francisco, CA (US)

(72) Inventors: Andrew Carl Miner, San Francisco, CA (US); Jonathan King Mapel, San Francisco, CA (US)

(73) Assignee: Mirada Technologies Inc., San Francisco, CA (US)

( * ) Notice: Subject to any disclaimer, the term of this patent is extended or adjusted under 35 U.S.C. 154(b) by 0 days.

(21) Appl. No.: 16/191,984

(22) Filed: Nov. 15, 2018

(65) Prior Publication Data

US 2019/0101671 A1    Apr. 4, 2019

Related U.S. Application Data

(63) Continuation-in-part of application No. PCT/US2018/057531, filed on Oct. 25, 2018, and a
(Continued)

(51) Int. Cl.
  *G02B 26/08*    (2006.01)
  *G02B 5/09*    (2006.01)
  *G02B 26/12*    (2006.01)

(52) U.S. Cl.
  CPC .............. *G02B 5/09* (2013.01); *G02B 26/121* (2013.01)

(58) Field of Classification Search
  CPC .......... G02B 5/09; G02B 26/121; G02B 1/06; G02B 26/08; F16C 17/00
(Continued)

(56) References Cited

U.S. PATENT DOCUMENTS 2,417,002 A * 3/1947 Leventhal ............. G03B 41/08
                                              352/119
2003/0202265 A1* 10/2003 Reboa ...................... B81B 7/04
                                              359/877
(Continued)

OTHER PUBLICATIONS

Notification of Transmittal of the International Search Report and the Written Opinion of the International Searching Authority, or the Declaration, for corresponding International Application No. PCT/US2018/019132 (15 pages) (dated May 21, 2018).
(Continued)

*Primary Examiner* — Euncha P Cherry
(74) *Attorney, Agent, or Firm* — Myers Bigel, P.A.

(57) ABSTRACT

An optical beam steering device includes an at least partially optically transparent container having a polygonal reflector therein that is at least partially surrounded within the container by an optically transparent liquid. The polygonal reflector may be configured to have a center of mass, which is equivalent to its geometric center. In addition, the polygonal reflector may be configured so that a difference between an effective density of the polygonal reflector and a density of the optically transparent liquid is preferably less than about 2.1 grams per cubic centimeter. More preferably, the polygonal reflector and the optically transparent liquid may be collectively configured to be neutrally buoyant relative to each other within the container.

30 Claims, 15 Drawing Sheets

Related U.S. Application Data continuation-in-part of application No. PCT/US2018/033363, filed on May 18, 2018, and a continuation-in-part of application No. PCT/US2018/019132, filed on Feb. 22, 2018, and a continuation-in-part of application No. 15/897,977, filed on Feb. 15, 2018, now Pat. No. 10,444,488.

(60) Provisional application No. 62/577,329, filed on Oct. 26, 2017, provisional application No. 62/603,175, filed on May 20, 2017, provisional application No. 62/600,577, filed on Feb. 24, 2017.

(58) Field of Classification Search
USPC ..................................................... 359/226.3
See application file for complete search history.

(56) References Cited

U.S. PATENT DOCUMENTS

| | | |
|---|---|---|
| 2008/0310031 A1 | 12/2008 | Mohr et al. |
| 2011/0181852 A1 | 7/2011 | Bleidistel et al. |
| 2011/0182621 A1 | 7/2011 | Hirakawa |
| 2012/0007778 A1 | 1/2012 | Duwel et al. |
| 2013/0278907 A1 | 10/2013 | Abele et al. |
| 2017/0329252 A1* | 11/2017 | Emanueli ............ G03G 15/043 |

OTHER PUBLICATIONS

Notification of Transmittal of the International Search Report and the Written Opinion of the International Searching Authority, or the Declaration, for corresponding International Application No. PCT/US2018/033363 (10 pages) (dated Aug. 10, 2018).

* cited by examiner

OPTICAL BEAM STEERING DEVICES HAVING POLYGONAL REFLECTORS THEREIN

REFERENCE TO PRIORITY APPLICATIONS

This application is a continuation-in-part of U.S. application Ser. No. 15/897,977, filed Feb. 15, 2018, which claims priority to U.S. Provisional Application Ser. No. 62/600,577, filed Feb. 24, 2017, U.S. Provisional Application Ser. No. 62/603,175, filed May 20, 2017 and U.S. Provisional Application Ser. No. 62/577,329, filed Oct. 26, 2017. This application is also a continuation-in-part of International Patent Application No. PCT/US2018/019132, filed Feb. 22, 2018; International Patent Application No. PCT/US2018/033363, filed May 18, 2018; and International Patent Application No. PCT/US2018/057531, filed Oct. 25, 2018. The disclosures of each of these patent applications are hereby incorporated herein by reference.

FIELD OF THE INVENTION

The invention relates to directing beams of light in specific directions using movable reflective surfaces, and in a robust, reliable manner.

BACKGROUND OF THE INVENTION

Directing beams of light in specific directions has many applications, and many technologies exist that can accomplish this task. Light, also known as radiation, may be composed of a broad distribution of wavelengths (broad band), such as white light, or may be a very narrow band of wavelengths, such as produced from a typical laser (narrow band). The wavelengths that compose light may be in the visible range, detectable by our eyes, or outside the visible range. Light just beyond the visible range on the long wavelength side of the spectrum is known as infra-red radiation. Light just beyond the visible range on the short wavelength side of the spectrum is known as ultra-violet.

Beams of light may be directed by various means, but directing light by means of a reflecting, movable surface, or mirror, is the most relevant to the present invention. A technology that can provide a reflective surface, and move that reflective surface in a controlled, high speed manner can find application in uses such as microscopy, projection displays, laser sensors, and similar. Should these technologies be enabled in a manner that makes them immune from distortion or damage due to external vibrations, accelerations, and gravitational orientations, the technologies become useful in a broader range of harsh conditions.

There are a number of actuation technologies know in the prior art, when coupled to reflective mirrors provide controlled beam steering. For example, there are a variety of methods for actuation that utilize electromagnetic effects. One method of directing light in a controlled manner at high speeds uses an electromagnetic device known as a galvanometer. This technology uses permanent magnets and/or ferromagnetic materials with electrical coils. Electrical current driven through the device initiates motion that can be controlled in a closed loop or an open loop manner. This actuation technology coupled to a mirror can provide a high speed mechanism to control and direct light.

It has been observed that galvanometer-based technologies consume significant electrical power under operation, making them incompatible for applications where electrical power is constrained. The electrical power consumption is largely a function of the mass of the mirror being moved, and the fact that significant energy is expended to accelerate the mirror to a position, then decelerate the mirror to stop at the desired position. The back and forth oscillatory nature of the devices is not as energetically favorable with respect to a technology that continuously rotates. It has been further observed that the mechanical complexity of the construction of galvanometer-based technologies limits the ability to miniaturize this technology to achieve low cost.

Light can also be directed in a controlled manner using mirror systems driven by voice coil actuators/motors (VCAs). Voice coil motors are typically relatively simple electrical devices, which are similar to a galvanometer, and sometimes also called a solenoid. Electrical energy applied to the windings drives a core linearly, driven by magnetic repulsion. Voice coil motors coupled to the edges of a mirror can be actuated in a controlled manner to tile the mirror and effectively direct light.

It has been observed that voice coil mirror systems consume significant amounts of electrical power, and given that they have multiple parts including fine electrical windings, they are difficult to miniaturize at low cost. The electrical power consumption is largely a function of the mass of the mirror being moved, and the fact that significant energy is expended to accelerate the mirror to a position, then decelerate the mirror to stop at the desired position. The back and forth oscillatory nature of the devices is not as energetically favorable with respect to a technology that continuously rotates.

Another technology that uses reflective surfaces for directing light in a controlled manner is electrostatic actuation. This technology uses that fact that when voltage is applied across two surfaces at close proximity, positive and negative charges collect on the respective surface, and an attractive force is generated. This actuation effect can be applied in a beam steering technology by using the force generated, and the resulting motion of attractive surfaces to change the angle of a mirror.

It has been observed that electrostatic actuation results in small movements, which in turn, even when mechanically amplified into larger angles, results in modest angles of motion in the mirror.

Piezoelectric effects also can be coupled to a mirror for beam steering. Certain materials expand when subject to high voltages, in a process known as the piezoelectric effect. It has been observed that mirror systems driven by piezoelectric effects, similar to electrostatic actuators, deliver multiple angles of motion in the mirrors.

Electrothermal actuation can be used to drive controlled angular deflection in mirrors. This class of device takes advantage of the fact that most materials expand in length when heated. By careful design, electrical power can be dissipated selectively in electrothermal actuators to produce bending or linear extension. This motion can then be coupled with mirrors to deliver a beam steering effect.

It has been observed that electrothermal actuators are relatively slow, and do not produce high speed precision motion relative to other technologies. Additionally, they typically consume significant electrical power in order to generate the high temperatures in regions of the actuators. In order to produce high temperatures and the associated thermal expansion more efficiently, some such product package the actuators in vacuum or low thermal conductivity gasses, adding to the cost of the product.

The aforementioned actuation technologies that allow for the controlled steering of light can be realized using several different manufacturing technologies. These technologies can be manufactured by traditional means, including machining, electrical winding, and hand assembly. Additionally, these beam steering technologies can be realized using semiconductor-like fabrication technologies, known as Micro-Electro-Mechanical Systems (MEMS).

As these devices are miniaturized, typically the actuation speeds that can be realized increase, due to the reduction in the amount of mass in motion. It has been observed that traditional manufacturing methods such as used in galvanometers and voice coil technologies do not scale down to small sized cost effectively. MEMS manufacturing technology has the capability of forming high precision mechanical structures at sub-millimeter scales, but it has been observed that the beam steering devices manufactured using MEMS fabrication, even when produced on large silicon wafer, do not achieve sufficiently low cost in high production volume. This is generally due to the complexity of each manufacturing step, the number of manufacturing steps, and the complex equipment typically required.

Another technology that is effective in directing beams of light in a controlled manner is known as a polygonal scanner, in which a polygon with reflective outer surfaces is rotated. Incident light reflecting of the rotating polygon's perimeter is scanned in three-dimensional (3D) space based on the speed of the polygons, number of outer sides, and the angle of each mirror side. This approach is energetically favorable with respect to the oscillatory technologies where a mirror is accelerated and decelerated back and forth, but lacks the ability for the mirror to maintain a fixed position if required. Polygonal scanner mirrors are typically mounted on a shaft on bearings, and is rotated using an electromagnetic motor. Polygonal scanners may be configured as a rotating plane with one or two sides that are reflective, or may be a multi-sided polygon with several hundred of reflective faces on the perimeter. Typical mirrors found in these devices have three to eight sides. The mirrors rotate on bearings that may be based on ball bearings or air bearing technology. Polygonal mirrors have found broad application in markets such as bar code readers, 3-D imaging, light detection and ranging (LiDAR), laser printing, and light shows for entertainment purposes. Polygonal mirrors are typically formed in lightweight metals such as aluminum, but some applications use copper for low speed stability. For low cost application the polygonal mirrors are formed with plastics. The outer reflective surfaces are formed with the economic and optical needs of the application in mind, and typically include aluminum, gold, silver, or nickel.

It has been observed that polygonal mirror scanners that use ball bearing based bearing systems can be susceptible to dust and moisture from the environment and under continuous operation, and typically have a lifetime for reliable operation that is under two years. Ball bearing based bearing systems are more robust under mechanical forces and vibration than alternative air bearings, but also can be damaged due to external forces, gravitational changes, and vibrations. It has also been observed that polygonal mirror scanners that use air bearings have long lifetimes when used in stationary, low vibrational environments, but are highly susceptible to shock and vibration that can result in catastrophic failure. Polygonal air bearings keep the high speed rotating shaft and mirror separate from the fixed mounting and motor surfaces by creating a high speed layer of air in a designed gap. This air can be actively pumped into the bearing gap, or naturally entrained into the air bearing gap by the rotation of the device. When subjected to significant acceleration, the suspended moving mass can bridge that gap, colliding with the fixed surfaces and initiate an imbalance in the high speed rotation, leading to catastrophic failure.

SUMMARY OF THE INVENTION

An optical beam steering device according to some embodiments of the invention includes an at least partially optically transparent container having a polygonal reflector therein that is at least partially surrounded within the container by an optically transparent liquid. The polygonal reflector may be configured to have a center of mass, which is equivalent to its geometric center. In addition, the polygonal reflector may be configured so that a difference between an effective density of the polygonal reflector and a density of the optically transparent liquid is less than about 2.1 grams per cubic centimeter and, more preferably, less than about 0.5 grams per cubic centimeter so that the polygonal reflector and the optically transparent liquid are closely neutrally buoyant relative to each other within the container.

According to additional embodiments of the invention, the polygonal reflector includes a main body having at least one magnetic material region therein and an optically reflective coating thereon. The main body may also include a material therein, which has a lower density relative to a density of the at least one magnetic material region.

In some further embodiments of the invention, the polygonal reflector is annular-shaped and the container includes a hub extending through an opening in the annular-shaped polygonal reflector, which is filled with the optically transparent liquid. This optically transparent liquid within the opening may operate as a liquid bearing when the annular-shaped polygonal reflector rotated about the hub. In addition, at least a portion of the container may be formed of a non-ferromagnetic material.

According to additional embodiments of the invention, first and second motor assemblies may be provided, which extend adjacent corresponding first and second opposing portions of the container. For example, if the container is cylindrically-shaped and has first and second lids thereon, then the first and second motor assemblies may extend adjacent the first and second lids, respectively.

In some further embodiments of the invention, a motor may be provided within the container, which is mechanically coupled to the polygonal reflector by a shaft. In particular, the container may include a cylindrically-shaped and optically transparent window attached to top and bottom lids, and the motor may be disposed on one of the lids. In some further embodiments, the container may be partially filled by the optically transparent liquid and partially filled by a gas. The motor and at least a portion of the shaft may be exposed to the gas within the container.

According to additional embodiments of the invention, the container may be partially filled by the optically transparent liquid and partially filled by a gas, and may even be configured as a pressure-compensated structure having a gas containing region therein. This gas region may be remote relative to the polygonal reflector and the motor, which are fully submerged within the optically transparent liquid.

According to further embodiments of the invention, an actuator may be provided in the container. This actuator, which may be mechanically decoupled from the polygonal reflector, can be configured to induce rotation of the polygonal reflector within the container by causing movement of the optically transparent liquid therein. In some embodiments, the actuator may be selected from a group consisting of: (i) a fluid pump, and (ii) a motor having a rotational shaft.

In additional embodiments of the invention, the polygonal reflector is embedded within an optically transparent encasement having a smooth outer surface. This optically transparent encasement may have a circular perimeter when viewed in cross-section. The container and the polygonal reflector may also be mechanically coupled to respective stabilization structures within the container that define a plurality of fluid channels therebetween. During operation, these fluid channels may support the self-correction of off-axis movement of the polygonal reflector when rotating within the optically transparent liquid.

BRIEF DESCRIPTION OF THE DRAWINGS

The accompanying drawings, which are incorporated in and form a part of this specification, illustrate various embodiments of the invention and, together with the description, serve to explain the principles of the invention.

DETAILED DESCRIPTION OF THE INVENTION

Reference will now be made in detail to embodiment(s) of the present invention. While the invention will be described in conjunction with the embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, and components may not have been described in detail as not to unnecessarily obscure aspects of the present invention.

The present invention enables the control of a reflective surface or mirror, enabling the redirection of an incident beam of light. Critically, the controlled scanning of light is enabled in a manner making the system highly resistant to external forces and vibration.

Figure 1A:
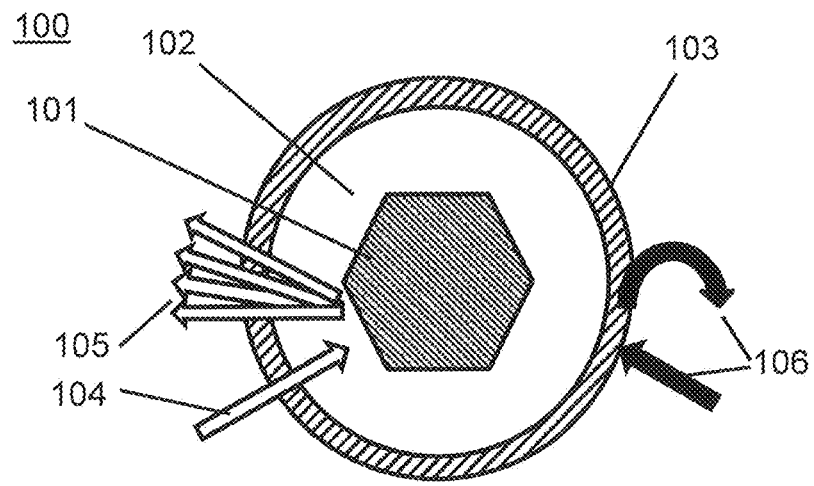
FIG. 1A is a top sectional view of a Neutrally Buoyant Polygonal Scanner (NBPS) according to an embodiment of the invention.

FIG. 1A is a schematic representation of a top sectional view of a Neutrally Buoyant Polygonal Scanner (NBPS) 100 according to an embodiment of the invention. A polygonal reflector 101 is centrally located, surrounded by a fluid 102. The polygonal reflector 101 and fluid 102 are contained within a rigid solid container 103. Incident light 104 passes through an optically transparent wall of the container 103 and the optically transparent fluid 102, and is reflected by the rotating polygonal reflector 101. Reflected light 105 is emitted from the NBPS 100 at various angles dictated by the rotational position of the polygonal reflector 101.

Key to the present invention is the nature of the design and composition of the polygonal reflector 101 and the fluid 102. The solid polygonal reflector 101 is designed to have an average density equivalent to an average density of the fluid 102. Additionally, the solid polygonal reflector 101 is preferably designed to have its center of mass located at its geometric center so that the system of the combined polygonal reflector 101 and fluid 102 is substantially neutrally buoyant. This substantially neutrally buoyant condition can also be present when the polygonal reflector 101 is configured to have an effective density within ±30% of an effective density of the fluid 102. More preferably, the polygonal reflector 101 can be configured to have an effective density within ±10% of an effective density of the fluid 102.

Advantageously, when this neutrally buoyant condition is present, the polygonal reflector 101 does not float, nor does it sink within the surrounding fluid 102 under the influence of gravity. Accordingly, as the orientation of the NBPS 100 with respect to gravity changes, there is little to no relative motion induced between the polygonal reflector 101 and the fluid 102. This condition may be present, for example, when the NBPS 100 is employed in an automobile, in a condition where the automobile's orientation changes going up or down a hill, the relative position of the polygonal reflector 101 and the fluid 102 is relatively unaffected. More broadly, this condition of neutral buoyancy of the polygonal reflector 101 and fluid 102 and the coincident center of mass and geometric center of the polygonal reflector 101 make the combined system largely immune relative motion and disruption due to external forces and moments 106 applied to the container 103 of the NBPS 100. Under turbulence, road vibration, spinning, or other conditions that a polygonal scanning system may see in various applications, the resulting forces and moments 106 will generally not alter the relative position of the polygonal reflector 101 within the fluid 102. This holds true whether the polygonal reflector 101 is rotating at high speed relative to the container 103 as is the case when the NBPS 100 is in operation, or if the polygonal reflector 101 is stationary with respect to the container 103, as is the case when the NBPS is not in operation. The achievement of neutral buoyancy enables perfect or near perfect immunity to the effects of external forces and moments 106 is one advantageous aspect of at least some embodiments of the invention.

In an additional embodiment of the present invention, the average density of the polygonal reflector 101 designed to be similar to the density of the fluid 102. In other words, since the density of all materials changes to some degree over a range of expected operating temperatures, the present invention discloses methods of designing the polygonal reflector 101 to have an average density similar to the average density of the fluid 102, over the temperature ranges that the system will typically see under operation in a respective application. For example, when the NBPS 100 is used in an application where the environmental temperature may range from −30 to 80° C., the polygonal reflector 101 and the fluid 102 may be designed to have the identical average density at the typical operating temperature of 20° C., and therefore have ideal immunity from external forces and moments 106 at that specific temperature. At lower or higher temperatures, the degree of density change of the respective polygonal reflector 101 and the fluid 102 may be different, but by design, their average densities remain similar over the anticipated range of operating temperature, to thereby provide a relatively high degree of immunity from the effects of externally applied forces and moments 106.

In an embodiment of the present invention, the polygonal reflector 101 may be a composite assembly of various solid materials, detailed in a following figure, and may include plastics, metals, and ceramics. Additionally, in order to match the average density of the fluid 102, the polygonal reflector 101 may contain encapsulated regions of low density gas, such as air or helium, or low density solids such as aerogel. The outer reflective surface of the polygonal reflector 101 is coated with a reflective material dictated by the optical requirements of the application, and may be composed of aluminum, silver, copper, nickel or gold. The polygonal reflector 101 may have any number of sides, including six as illustrated, but may range from two to several hundred. Fewer sides increases the angle swept of the reflected beam 105, but a polygon with a low number of sides typically induces more chaotic fluid motion in the fluid 102 as the polygonal reflector 101 rotates. A higher number of sides provides more scans of the reflected beam 105 per rotation of the polygonal reflector 101, but reduces the maximum scan angle of the reflected beam 105. In a preferred embodiment of the present invention the fluid 102 is a liquid and, in order to provide a wide range of operating temperatures while remaining in the liquid state without freezing or boiling, can be composed of a Fluorinert liquid such as FC-40 or FC-43. The container 103 is composed of a material that is optically transparent at the wavelength of light used in the incident light 104, such as glass or plastic. The specific choice and composition depends on the wavelength for the application.

Figure 1B:
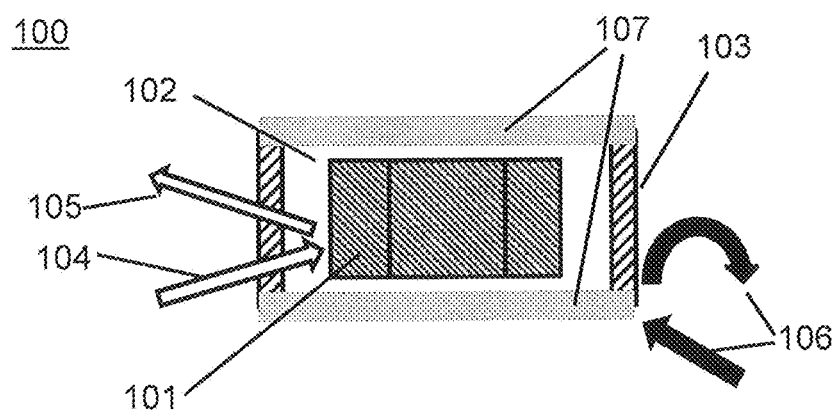
FIG. 1B is a side sectional view of the NBPS of FIG. 1A.

FIG. 1B is a side cross-sectional view of the NBPS 100 of FIG. 1A. The polygonal reflector 101 is shown centrally in a side view, submerged in a fluid 102, all encapsulated by a container 103 and top/bottom lids 107. The incident beam of light 104 is shown reflected as the reflected light 105.

In a preferred embodiment of the present invention, the lids 107 are composed of non-ferromagnetic metals such as aluminum (Al). In additional embodiments they are composed of non-ferromagnetic materials such as plastic, non-magnetic steels, nonmagnetic stainless steel, brass, copper, or ceramics. Optionally, in additional embodiments, the container 103 and lids 107 can be composed of a single continuous common material that is appropriately optically transparent.

Figure 2A:
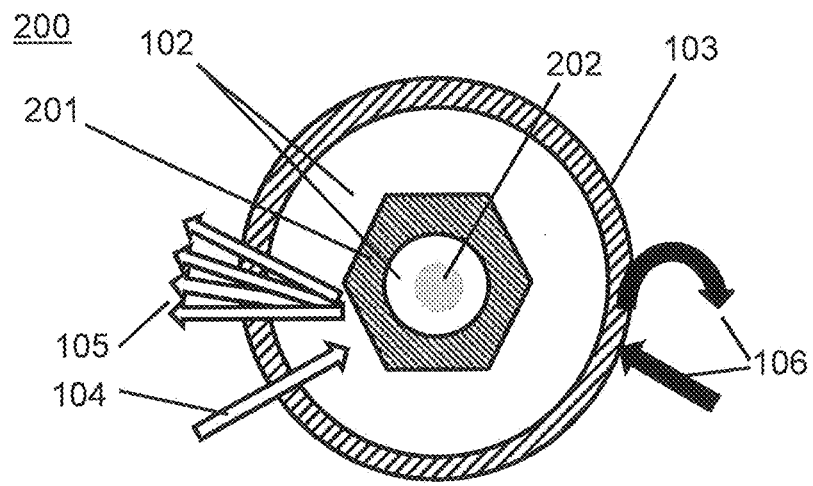
FIG. 2A is a top sectional view of an NBPS according to an embodiment of the invention.
Figure 2B:
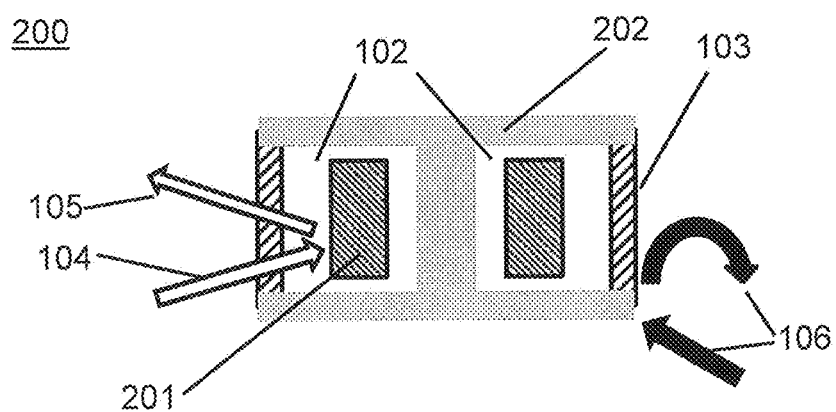
FIG. 2B is a side sectional view of the NBPS of FIG. 2A.

FIG. 2A shows a top cross-sectional view of a Neutrally Buoyant Polygonal Scanner (NBPS) 200 according to an embodiment of the invention. FIG. 2B shows a side cross-sectional view of the NBPS 200 of FIG. 2A. In both figures, the polygonal reflector 201 has a central hole through it, allowing it to rotate about a central hub of a lid/hub structure 202. A fluid 102 surrounds the polygonal reflector 201 and the gap between the central lid/hub 202, thereby creating, in effect, a fluid bearing.

As with the NBPS embodiment shown in FIGS. 1A and 1B, the polygonal reflector 201 illustrated by FIGS. 2A and 2B is preferably designed to have an average density identical or nearly identical to that of the fluid 102 at a certain temperature within the operating range. The average densities of the polygonal reflector 201 remains similar to the fluid 102 over the temperature range of operation, so that there is little or no relative motion between the polygonal reflector 201 and the fluid 102 when subject to external forces and moments 106 at a certain temperature and minimal relative motion across the temperature range of operation.

The polygonal reflector 201 may be composed of the same materials previously described for the polygonal reflector 101 of FIGS. 1A-1B. The lid/hub 202 is preferably composed of a non-magnetic material such as certain metals including aluminum, certain stainless steels, and copper. In additional embodiments of the invention, the lid/hub 202 may be composed of plastics. The lid/hub 202 and surrounding container 103 may also be configured a single continuous material that is appropriately optically transparent.

Figure 3A:
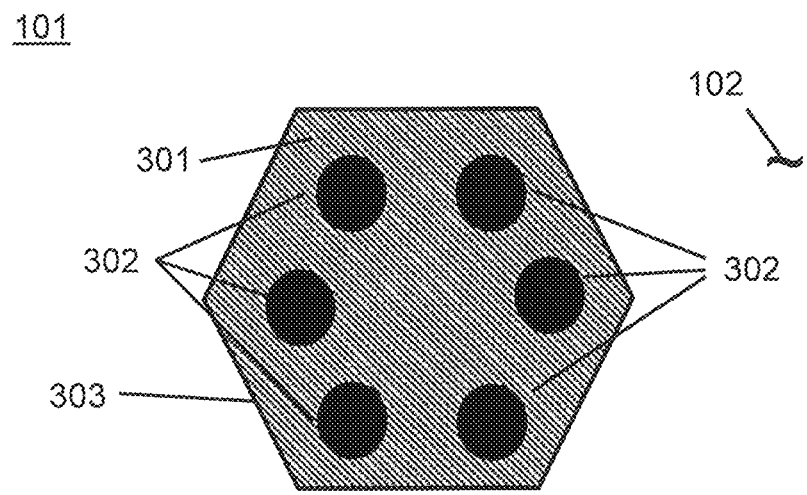
FIG. 3A is a top sectional view of a polygonal reflector according to an embodiment of the invention.
Figure 3B:
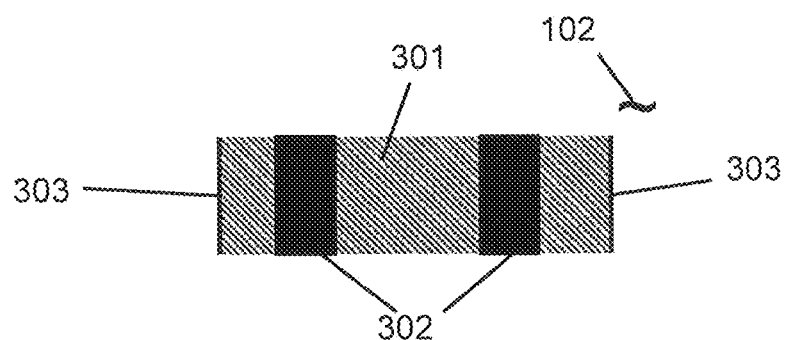
FIG. 3B is a side sectional view of the polygonal reflector of FIG. 3A.

FIG. 3A is a top cross-sectional diagram of an embodiment of the polygonal reflector 101 and FIG. 3B is a side sectional view of the polygonal reflector of FIG. 3A. A main body 301 is shown, with embedded magnetic materials 302. The polygonal reflector 101 is shown as having six sides, with six embedded magnetic materials 302 therein. A reflective coating 303 covers the outer perimeter of the main body 301, providing a reflective surface to reflect incident light. A fluid 102 surrounds the polygonal reflector 101.

This embodiment of the polygonal reflector 101 illustrates the ability to provide the overall function of the NBPS, which is to reflect light at large angles and at high speed, while delivering the reliable function and advantageous benefits enabled by the present invention, which is neutral buoyancy. To create neutral buoyancy between the polygonal reflector 101 and the surrounding fluid 102, the main body 301 material is typically of lower density than the fluid 102, while the reflective coating 303 (e.g., metal) typically has a higher density. The contribution of the reflective coating 303 to the average density is small, given that it typically is a thin coating with a relatively small volume. However, given the typical nature of magnetic materials, the embedded magnetic materials 302 are of relative high density. In order to spin the polygonal reflector 101, the magnetic materials support the function of the reflector as a rotor in an electromagnetic motor, driven by electromagnetic forces from above and below. In an embodiment of the present invention where the rotational motion of the polygonal reflector 101 is generated by an external variable reluctance electric motor, the magnetic materials 302 may be high permeability ferromagnetic material such as iron, mu-metal (e.g., nickel-iron soft alloy) or silicon steel. In an embodiment where the motion of the polygonal reflector 101 is initiated by a brushless DC motor, stepper motor, or similar, the magnetic materials 302 may be composed of permanent magnetic materials with permanent north and south poles. The embedded magnetic materials 302 enable the polygonal mirror to function as the moving rotor of an electromagnetic motor, and the careful design, sizing and volume of the main body 301, the magnetic materials 302, and the reflective coating 303 allow the average density to match that of the external fluid 102, which gives the system an overall neutral buoyancy and significant immunity to the degrading effects of external forces and moments 106.

Figure 4:
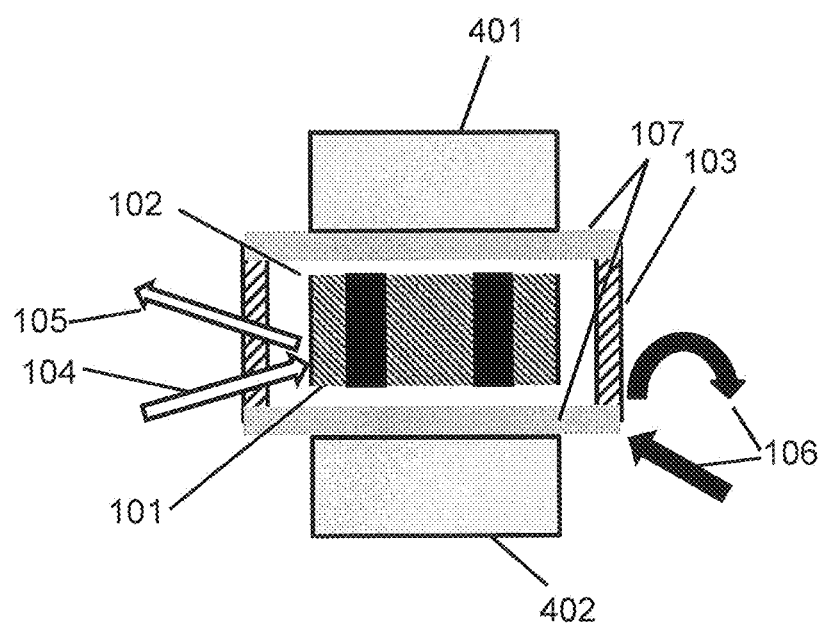
FIG. 4 is a side sectional view of an NBPS according to an embodiment of the invention.

FIG. 4 shows a cross sectional view of the NBPS 400. An upper motor assembly 401 is shown in contact with the lid 107. A lower motor assembly 402 is shown in contact with the lid 107. These assemblies, along with the centrally located polygonal reflector/mirror 101, which serves as a rotor, create what is known is a double stator pancake style electromagnetic motor. The polygonal reflector/mirror 101, with its embedded magnetic materials responds to time varying magnetic fields generated in the upper motor assembly 401 and lower motor assembly 402, allowing the polygonal reflector/mirror 101 to rotate with respect to the fixed lids 107 and container 103. At the same time, the condition of neutral buoyancy created between the polygonal mirror 101 and the fluid 102 protects the polygonal mirror form damage due to external forces or moments 106.

According to additional embodiments of the invention, an NBPS may be implemented using drive mechanisms that are adaptations of existing motor technologies, such as homopolar, hysteresis synchronous motors and inductive motor technologies. These two motor technologies can be attractive as drive mechanisms for an NBPS because they can be formed without magnetic materials located on the rotor. As such, the neutrally buoyant mirror system described herein, which serves as the rotor, can be formed without heavy magnetic materials such as steel or ferrite, or permanent magnets. This allows for the average density to be more easily balanced with the surrounding fluid. This also enables the rotor, which can omit magnetic materials as part of its structure and has no physical shaft connecting it to the stator, to float freely when the motor electrical power is turned off, rather than be attracted to permanent magnets located in the stator structure. Homopolar motors are driven by passing electrical current onto the rotor through slip-ring structures. This current traveling in the rotor experiences Lorentz forces, causing the rotor to rotate. An induction motor is composed of electrically conducting coils, often arranged in a structure known as a "squirrel cage." As the name suggests, no electrical contact exists between the spinning rotor and the surrounding stator, and the electrical current is induced in the rotor windings in response to current and magnetic fields generated in and from the surrounding stator. An NBPS may also be realized using additional electrical motor configurations that allow a rotor to spin without physical contact to the stator, beyond the aforementioned homopolar and induction motor configurations.

Figure 5:
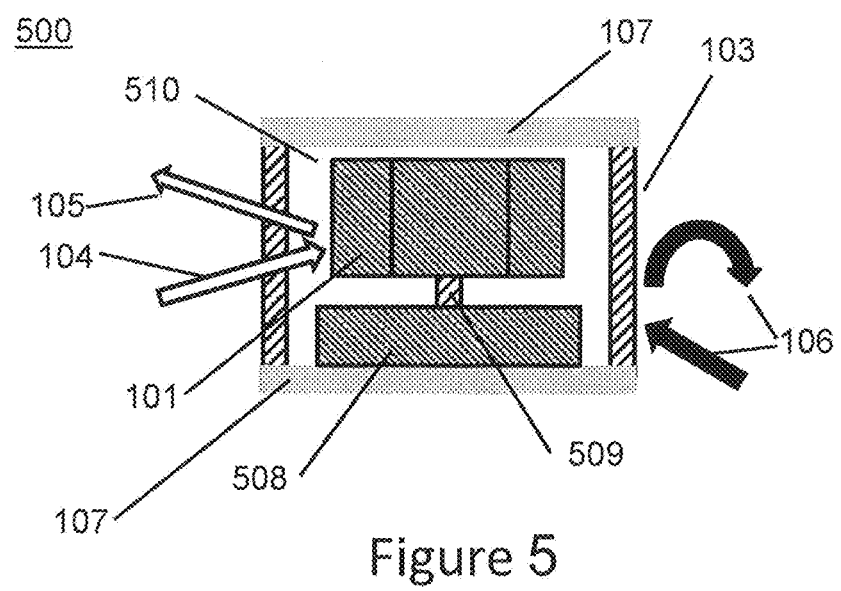
FIG. 5 is a side sectional view of an NBPS with a shaft, according to an embodiment of the invention.

FIG. 5 shows a cross sectional of view of an NBPS 500. In this embodiment of the invention, the polygonal reflector/mirror 101 is attached to a rigid shaft 509 by one or more bearing assemblies, such as ball bearing assemblies. And, the shaft 509 is rigidly attached to a motor 508, as shown. The fluid 510 in which the mirror is immersed functions as a lubricant, similar in function to a lubricant which might otherwise be used to lubricate a ball bearing assembly, except in this case the fluid 510 is also transparent to scanned laser light 104 at wavelengths of interest.

In contrast to a high speed operation of a motor and shaft-driven polygonal reflector in air, which will typically result in lubricant migration that typically increases operating friction and lowers long term reliability, the NBPS 500 of FIG. 5 suffers from no such limitations because the shaft and bearings are immersed in a "lubricant" at all times.

Ball bearing assemblies used in motor and shaft-based polygonal scanners are typically pre-loaded to increase scanner rotational dynamic track stability. In these cases, a portion of the electromagnetic drive power is converted to heat whenever the polygonal reflector is scanning. This heat can be dissipated away from the heat generation region. Optically transparent fluid 510 is also desirable as an efficient conduit of thermal energy, and its motion carries heat away from the thermal energy generation region, lowering peak temperatures at the bearing and increasing scanner long term reliability.

The index of refraction of the fluid 510 affects the refraction that occurs at the optically transparent window 103 and fluid 510 interfaces. To minimize reflections at this window-fluid interface, the refraction index mismatch is ideally zero over all operational temperatures. A higher refractive index in the fluid 510 increases the optical scan angle for a given mechanical rotation. In air, the relationship between the two angles is 2×, and is dictated by the law of reflection. However, in fluid, the two angles are related by greater than two (>2×) due to the two refractions that occur at the window-fluid interface. For a refractive index of 1.4, the relationship is approximately 3.2×. These two relationships are plotted in FIG. 6, which is a graph showing the relationship between a scanned mechanical angle and a scanned optical angle for polygonal scanners operated in fluid and in air.

Figure 6:
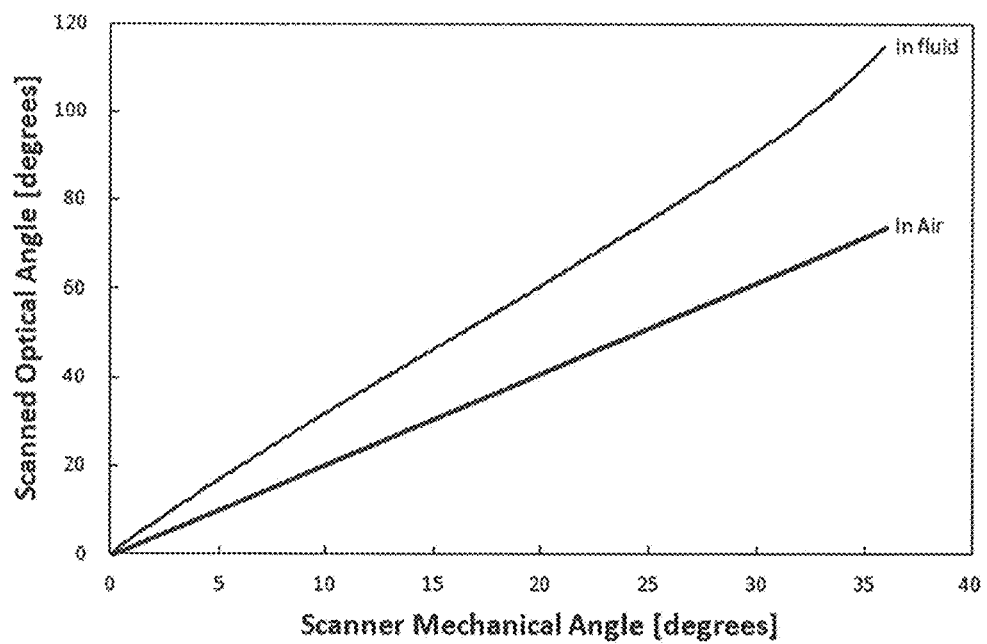
FIG. 6 is a plot showing a relationship between scanned mechanical angle (x-axis) and scanned optical angle (y-axis) for polygonal scanners operated in fluid and in air.

Thus, as shown by FIG. 6, for a desired optical scan angle, a smaller mechanical scan angle is required for fluid-immersed polygonal scanners, which means a polygonal reflector/mirror with a greater number of sides/facets can be used for a given scan angle requirement. In addition, by using a fluid-immersed polygonal reflector, an increase in scan rate for a regular polygon (n-fold rotational symmetry for n faces) can be achieved, or a greater number of scanned lines in an orthogonal dimension for an irregular polygon (adjacent faces rotated by two angular dimensions) can be achieved.

When the polygonal reflector/mirror is surrounded by a liquid 510, the outer shape of the liquid 510 can result in a focusing of a light beam. For a circular cross section of fluid around the axis of rotation, the effective shape is that of a bi-convex lens. If utilized in this configuration, the total optical system must take this focusing (i.e., distortion) into account.

Figure 7A:
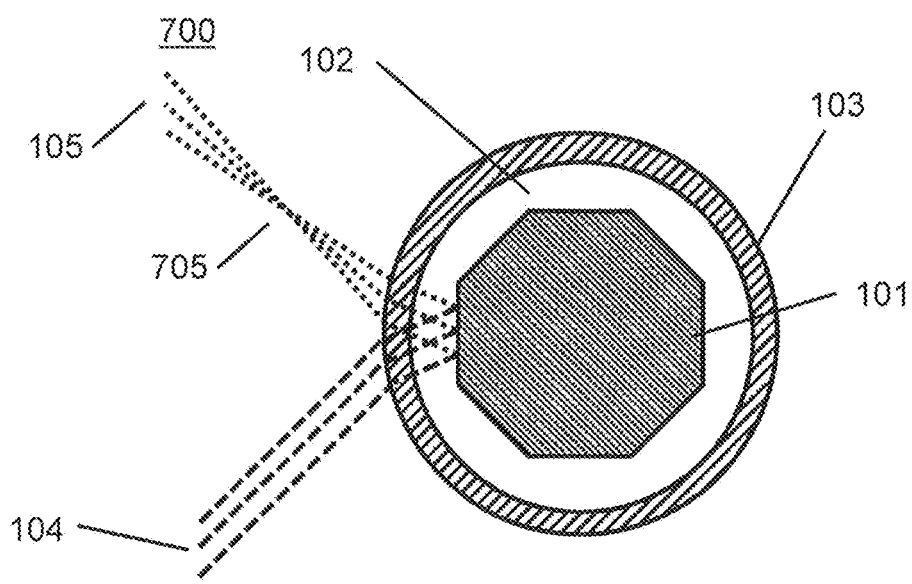
FIG. 7A is a top sectional view of a polygonal reflector within a circular container/window.

In the embodiment of FIG. 7A, a scanner 700 is comprised of polygonal reflector/mirror 101 immersed in a fluid 102, which is encased in a curved optically-transparent window 103 (with a circular cross section that is convex-shaped relative to incident light). In this configuration, incident laser beams 104 are refracted at least two times before being sent out as exiting beams 105. For this window 103, positive lensing is present and a focal point 75 exists, which may not be desirable with regard to other optical components in the overall sensor system.

Figure 7B:
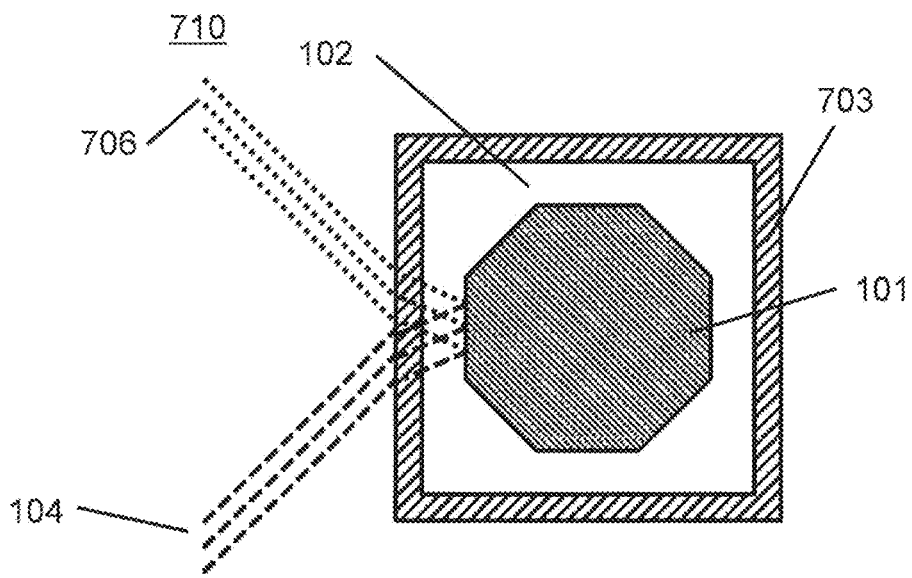
FIG. 7B is a top sectional view of a polygonal reflector within a square container/window.

However, in an alternative embodiment shown in FIG. 7B, the polygonal reflector/mirror 101 can be immersed within a fluid 102 within a planar housing with square windows 703. Using this configuration, the scanner optical system has only planar interfaces with refractive index step discontinuities, resulting in no lensing effects. Thus, incident collimated laser beams 104 undergo refraction but the divergence of the beam is not altered after passing through the polygon-based scanner 710 and collimated incoming beams 104 leave the scanner as collimated outgoing beams 706.

In laser beam steering systems where post scanner expansion optics are utilized, a beam telescope is typically placed at the z-distance of minimum beam width (beam waist) to minimize divergence of an outgoing beam such that beam divergence does not constrain field sampling resolution. This constraint is typically absent in fluid immersed polygonal scanner systems and the beam waist can be placed at other locations to the preference of the LIDAR system developer.

For a sensor system incorporating an optical scanner, it is typically advantageous to suppress unwanted optical reflections from the laser scanner to the greatest degree possible through judicious use of index matching, high reflectance coatings in the primary beam path, and low reflection coatings for unwanted reflections. Reflections that cannot be suppressed are desirably steered away from the primary beam path and the entire field of view of the scanner.

Figure 8:
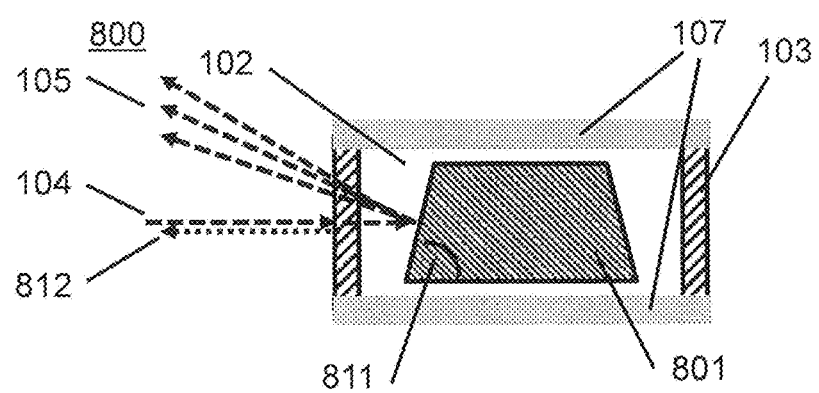
FIG. 8 is a side sectional view of an NPBS that utilizes an irregular polygonal reflector, according to an embodiment of the invention.

Incorporating geometrical features to steer away unwanted reflections is constrained by the overall sensor design. Polygonal laser scanners can be constructed with various configurations. For example, in an embodiment of an NBPS 800 illustrated in FIG. 8, an irregular polygon 801 with perpendicular optical and rotational axes is encased in an at least partially optically transparent container 103 with window. The angle 811 between the bottom facet of the polygon and the reflective facets is acute (i.e., less than 90°). In this configuration, incident laser beam 104 creates a Fresnel reflection due to the media step refractive index discontinuity at the air-window interface, thereby creating reflected beam 812. The outgoing laser beams 105 are scanned into the sensor field of view. However, reflected beam 812 is not scanned and is never sent into the field of view to thereby create potentially spurious signals at the detector of the sensor system. Other configurations are also possible to ensure unscanned reflected beams 812 are kept out of the field of view.

Figure 9:
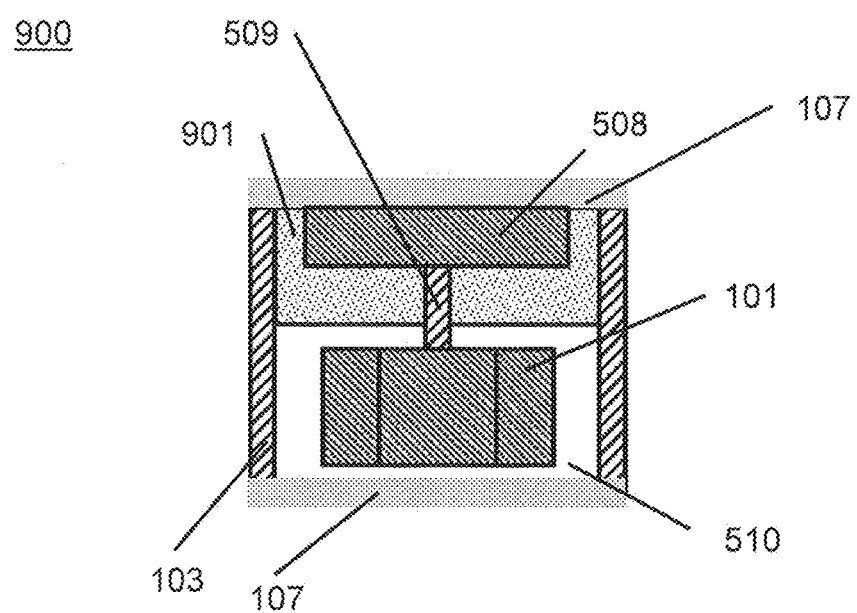
FIG. 9 is a side sectional view of an NBPS with an internal gas filled cavity, according to an embodiment of the invention.

FIG. 9 shows an implementation of the present invention where the internal cavity of the NBPS is partially filled with a gas 901 and partially filled with a liquid 510. The NBPS 900 is formed from encapsulating lids 107 and windows 103 that enclose the polygonal reflector/mirror 101, motor 508, and connecting shaft 509. The internal volume is partially filled with liquid 510 in this embodiment of the invention where the reflector/mirror 101 is located at the bottom of the system, allowing the liquid 510 and the reflector/mirror 101 to be fully or partially in a protective state of neutral buoyancy (NB), where the mass of the reflector/mirror 101 does not react significantly to external accelerations and thereby avoids material transfer of forces to the shaft 509 and the motor 508. This protective state of neutral buoyancy may be achieved when an effective density of the polygonal reflector/mirror 101 and a density of the optically transparent liquid 510 is less than about 2.1 g/cc (grams per cubic centimeter) and, more preferably, less than about 1 g/cc or even less than about 0.5 g/cc.

By having the upper region of the system remain in a gas 901, the motor may operate with less power because the fine internal structures are moving within a lower density gas 901 rather than a higher density, higher viscosity liquid 510. Additionally, in this configuration, the compressible gas 901 can readily change its density in response to increases in system temperature, reducing the incidence of relatively large increases in internal pressure that may cause the lids 107 or windows 103 to mechanically fail.

Figure 10:
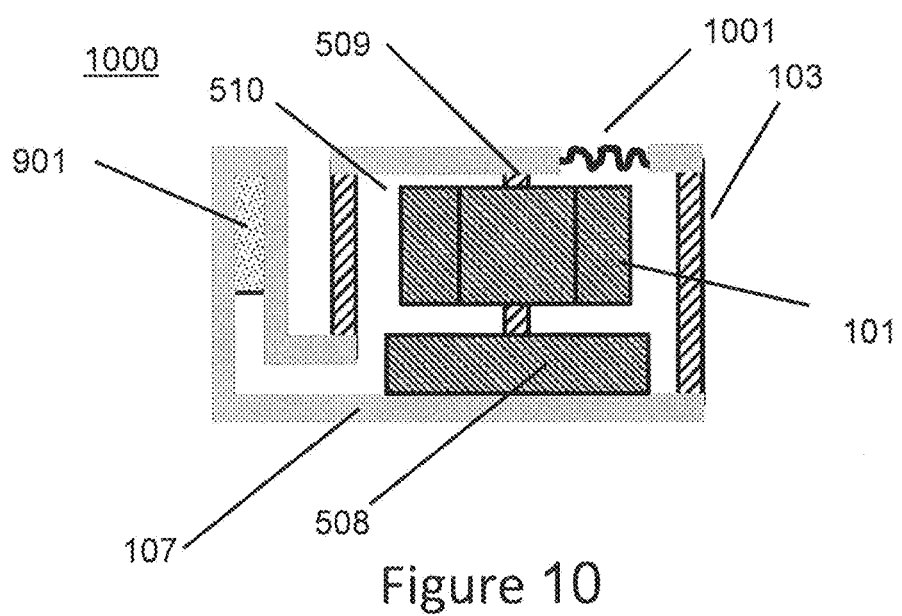
FIG. 10 is a side sectional view of a pressure-compensated NBPS according to an embodiment of the invention.

FIG. 10 illustrates a pressure compensated NBPS 1000 according to another embodiment of the invention. A pressure compensation structure is shown at the left where a region of gas 901 is captured in a location remote from the main body of the NBPS 1000 where the motor 508, shaft 509 and reflector/mirror 101 components are operating. The remaining body of the NBPS may be fully filled with liquid 510 as shown, or partially filled with liquid 510 and a gas 901. This embodiment of the present invention allows the gas 901 to change volume in response to changes in temperature and pressure, increasing reliability and avoiding breaks and leaks that could result from excessive internal pressure increases. The pressure compensated NBPS 1000 accomplishes this with a remote gas region 901 that will remain separated from the main body when the system is subjected to shock and vibration, or moderate changes in orientation with respect to gravity.

FIG. 10 also illustrates another method for pressure compensation, which utilizes a flexible member 1001. This flexible member 1001 may be formed from a thinner metal formed with undulations or with an elastic material that can respond to changes in internal pressure and increases in volume. As such, the flexible member 1001 serves to moderate any increases in internal pressure and reduces the chances of system enclosure failure.

Figure 11:
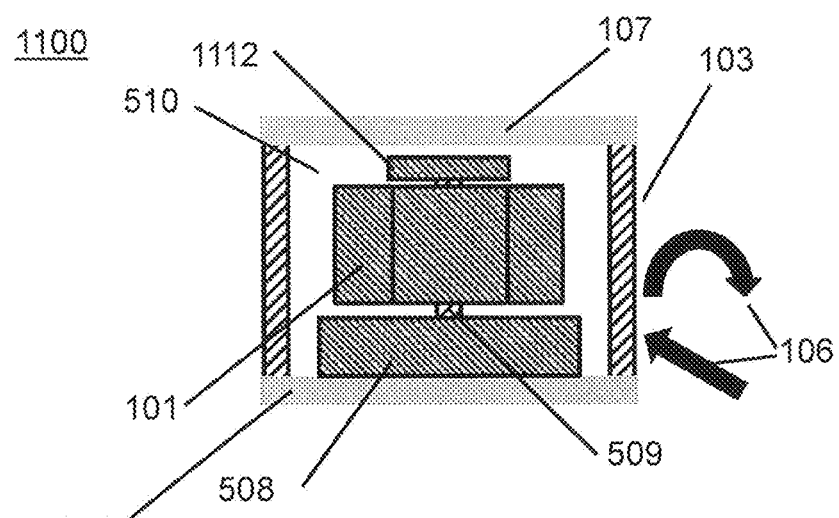
FIG. 11 is a side sectional view of an NBPS containing density adjusting structures, according to an embodiment of the invention.

An alternative embodiment of the invention is shown in FIG. 11, where an NBPS 1100 is illustrated as including a polygonal reflector/mirror 101 attached to a motor 508 by a rigid shaft 509. All of these components are immersed in a fluid 510 to thereby stabilize the shaft 509 and reflector/mirror 101 against external vibrations 106. The fluid is held in a container including windows 103 and lids 107. The shaft 509 is rigidly attached to the polygonal reflector 101, but can spin relative to the motor 508. In this embodiment, the shaft and a polygonal reflector family of rigid structures needs to have its average density matched to that of the fluid 510 in order to fully neutralize external acceleration forces. To meet this goal, additional structures 1112 can be included and rigidly attached to the shaft 509. The structures 1112 may be of several types, but their defining features include incorporating very low density solids or solid/gas composites such that rigid body combination of a structure 1112, a polygonal reflector 101 and a shaft 509 have an average density as close to that of the fluid 510 as possible. The gases may include air, nitrogen, or helium, and the low density solids/gas composites may include aerogels, polymer foams, metal foams and combinations thereof.

Figure 12:
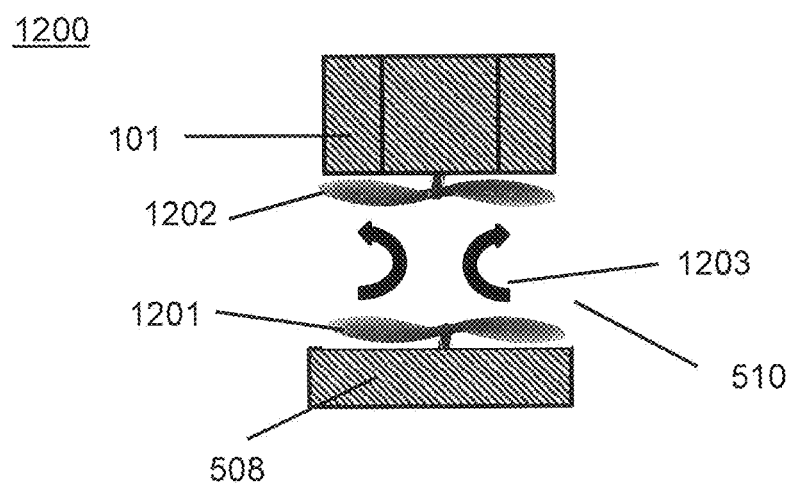
FIG. 12 is a side sectional view of a fluid-coupled NBPS according to an embodiment of the invention.

FIG. 12 illustrates a fluid-coupled NBPS 1200 according to an embodiment of the invention. This embodiment allows an actuator, such as a drive motor 508, to dynamically couple to the polygonal reflector/mirror 101 using properties of fluid dynamics and viscous flow and without any solid mechanical contact between the motor and reflector 101. As shown, motor 508 directly drives a drive fan 1201 that induces fluid flow 1203, which in turn couples to a remote "driven" fan 1202 that is rigidly connected to the polygonal reflector/mirror 101. According to this embodiment, high speed rotation of the reflector/mirror 101 may be advantageously achieved without solid contact and, as such, vibrations and cogging effects that may be present in the motor 508 may be damped out through the fluid coupling by fluid flow 1203. Therefore, the rotating reflector/mirror 101, which is neutrally buoyant or near neutrally buoyant with its surrounding fluid 510, may rotate independently of high frequency noise that may be generated by the motor 508.

This method of fan directed rotational coupling may operate using the same fluid coupling principles associated with automotive torque converters in transmission systems.

Figure 13:
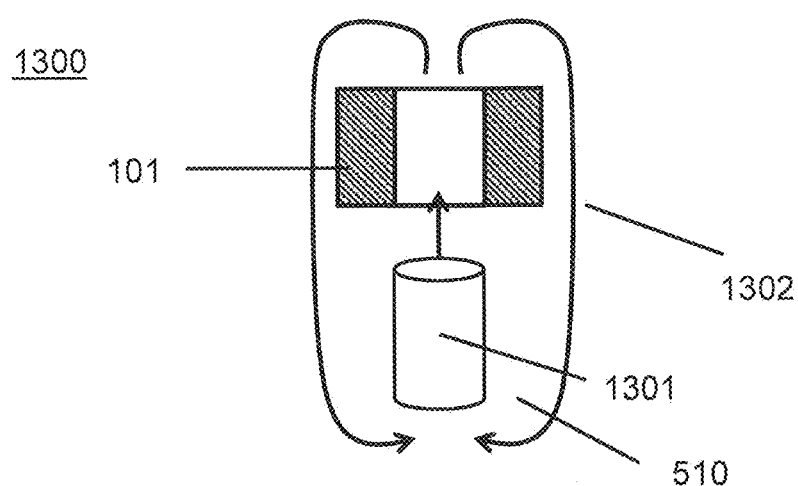
FIG. 13 is a side sectional view of a fluid-coupled NBPS according to an embodiment of the invention.

FIG. 13 shows a further embodiment of a fluid-coupled NBPS 1300. As shown, an actuator, such as a fluid pump 1301, drives fluid flow 1302 across the interior and exterior surfaces of a polygonal reflector/mirror 101, to thereby transfer energy to the reflector 101 and cause it to rotate. The reflector 101 can have exterior surface structures, which may operate as fins, that cause the reflector 101 to rotate due to the passage of fluid 1302 across its surfaces. Using this drive technique, the rotating reflector 101 can be mechanically decoupled from vibration of the fluid pump 1301, as well any additional external components (not shown) as it rotates in a neutrally buoyant state within its surrounding fluid 510.

Figure 14A:
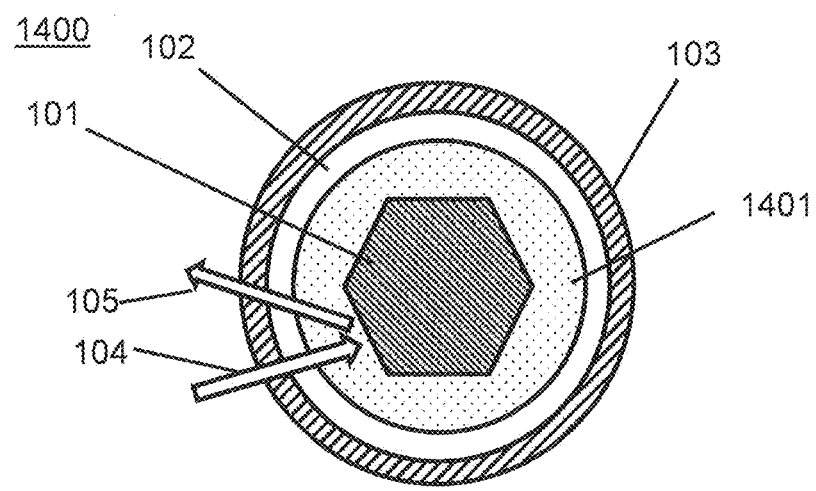
FIG. 14A is a top sectional view of a flow-stabilized NBPS according to an embodiment of the invention.

FIG. 14A shows a top view of a flow stabilized NBPS 1400 where the multi-faceted outer surface of the solid reflector/mirror 101 is encased in an optically transparent encasement 1401, which may have a smooth outer surface. The reflector 101 and the encasement 1401 are a unified body that rotate together. The smooth outer surface of the encasement 1401 allows for the outer fluid 102 to flow easily with reduced levels of any turbulence, which would more likely develop from any rotation of the multi-faceted reflector/mirror 101 in the absence of the encasement 1401. The encasement material is designed to be optically transparent at the optical wavelengths of the incident light 104, so that the incident light 104 may be transmitted through the fluid 102 and the encasement 1401 with little loss and then be reflected off the exterior surface of the rotating reflector 101 as reflected light 105.

Figure 14B:
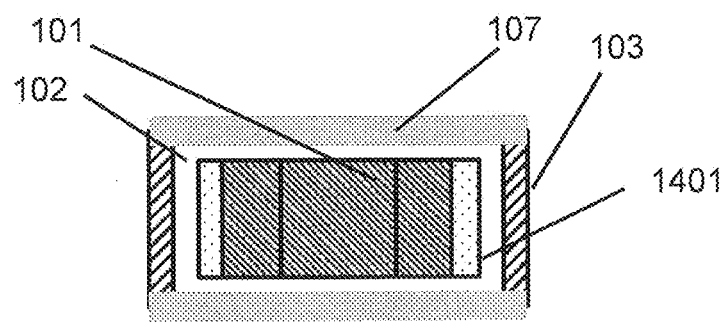
FIG. 14B is a side sectional view of the flow-stabilized NBPS of FIG. 14A.

FIG. 14B shows a side view of a flow stabilized NBPS 1400, where the transparent smooth encasement 1401 creates smooth flow channels for the fluid 102 adjacent the perimeter, top and bottom of the encasement 1401. These flow channels for the fluid 102 stabilize the flow and minimize any turbulent eddy currents that may otherwise disrupt rotational stability of the reflector/mirror 101. It is advantageous to select the materials of the encasement 1401 and the fluid 102 to have similar optical properties, so that optical losses at their interface may be reduced, and reflections or refractions of light at their interface may be reduced. As illustrated by FIGS. 14A-14B, the encased reflector/mirror 101 operates optically as a polygonal reflector, but advantageously behaves as a smooth bearing in terms of fluid mechanics. The use of an encased reflector 101 may be applied to the other shaft less and shafted embodiments described hereinabove.

Figure 15:
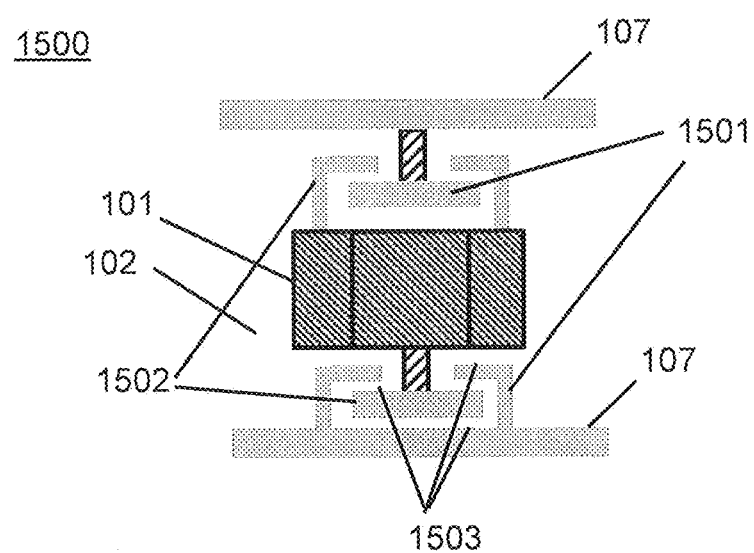
FIG. 15 is a side sectional view of an NBPS with stabilization structures, according to an embodiment of the invention.

FIG. 15 illustrates further embodiments of stabilization structures that enable a highly stable NBPS 1500. As shown, a reflector/mirror 101, which spins in a surrounding fluid 102, may be stabilized by the creation of thin fluid gaps 1503 between stationary structures 1501 and rotating structures 1502, which may be mechanically attached to shafts and lids 107, as shown. In particular, during operation, viscous forces exerted on the stationary structures 1501 and rotating structures 1502 may be balanced, so that the rotating reflector/mirror 101 may be continuously centered and stabilized. Moreover, should there be internal or external forces that move the reflector/mirror 101 towards the stationary structures, differential pressures in the thin fluid gaps 1503 will operate to "self center" the reflector/mirror 101, thereby restoring its position.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An optical beam steering device, comprising:
   an at least partially optically transparent container having a polygonal reflector therein that is surrounded on all sides thereof by an optically transparent liquid; and
   wherein the polygonal reflector and the optically transparent liquid are collectively configured to be neutrally buoyant relative to each other within the container.

2. The device of claim 1, wherein a center of mass of the polygonal reflector is located at the geometric center of the polygonal reflector.

3. The device of claim 1, wherein the polygonal reflector is annular-shaped; and wherein the container comprises a hub extending through an opening in the annular-shaped polygonal reflector, which is filled with the optically transparent liquid.

4. The device of claim 3, wherein the optically transparent liquid within the opening operates as a liquid bearing when said annular-shaped polygonal reflector rotated about the hub.

5. The device of claim 1, further comprising a motor in the container, which is mechanically coupled to the polygonal reflector.

6. The device of claim 5, wherein the motor is mechanically coupled to the polygonal reflector by a shaft.

7. The device of claim 5, wherein the container is partially filled by the optically transparent liquid and partially filled by a gas; and wherein the container is configured as a pressure-compensated structure having a gas containing region therein that is remote relative to the polygonal reflector and the motor, which are fully submerged within the optically transparent liquid.

8. The device of claim 1, wherein a difference between an effective density of the polygonal reflector and a density of the optically transparent liquid is less than about 2.1 grams per cubic centimeter.

9. The device of claim 1, wherein the optically transparent liquid is a Fluorinert liquid.

10. The device of claim 8, wherein the difference between the effective density of the polygonal reflector and the density of the optically transparent liquid is less than about 1 gram per cubic centimeter.

11. The device of claim 8, wherein the difference between the effective density of the polygonal reflector and the density of the optically transparent liquid is less than about 0.5 grams per cubic centimeter.

12. An optical beam steering device, comprising:
    an at least partially optically transparent container having a polygonal reflector therein that is at least partially surrounded within the container by an optically transparent liquid; and
    wherein the polygonal reflector and the optically transparent liquid are collectively configured to yield a substantially neutrally buoyant condition within the container.

13. The device of claim 12, wherein the polygonal reflector is configured to have an effective density within ±30% of an effective density of the optically transparent liquid.

14. The device of claim 12, wherein the polygonal reflector is configured to have an effective density within ±20% of an effective density of the optically transparent liquid.

15. The device of claim 1, wherein the polygonal reflector is configured to have an effective density within ±10% of an effective density of the optically transparent liquid.

16. The device of claim 1, further comprising:
a motor in the container; and
a shaft that mechanically couples the polygonal reflector to the electric motor so that optically reflective surfaces on an exterior of the polygonal reflector are rotated in front of at least one optically transparent window within the container, in response to motor-controlled rotation of the shaft within the optically transparent liquid.

17. The device of claim 16, wherein the shaft and polygonal reflector have an average density matched to a density of the optically transparent liquid.

18. An optical beam steering device for light detection and ranging (LiDAR), comprising:
a sealed container having at least one optically transparent window therein;
a motor in the container;
an optically transparent fluid at least partially filling the container; and
a polygonal reflector surrounded on all sides thereof by the optically transparent fluid and mechanically coupled by a shaft to the motor, said motor, shaft and polygonal reflector collectively configured so that optically reflective surfaces on an exterior of the polygonal reflector are rotated in front of the at least one optically transparent window, in response to motor-controlled rotation of the shaft within the optically transparent fluid; and
wherein the polygonal reflector, shaft and optically transparent fluid are collectively configured to yield a substantially neutrally buoyant condition within the container.

19. The device of claim 18, wherein the polygonal reflector is configured to have an effective density within ±30% of an effective density of the optically transparent fluid.

20. The device of claim 18, wherein a difference between an effective density of the polygonal reflector and a density of the optically transparent fluid is less than about 1 gram per cubic centimeter.

21. The device of claim 3, wherein the hub comprises a non-magnetic material.

22. The device of claim 3, wherein the hub comprises an optically transparent plastic.

23. The device of claim 3, wherein the opening in the annular-shaped polygonal reflector is a circular-shaped opening.

24. The device of claim 23, wherein the hub has a circular-shaped outer perimeter.

25. The device of claim 1, wherein the container is partially filled by the optically transparent liquid and partially filled by a gas; and wherein the container is configured as a pressure-compensated structure having a gas containing region therein that is remote relative to the polygonal reflector, which is fully submerged within the optically transparent liquid.

26. The device of claim 2, wherein the container is partially filled by the optically transparent liquid and partially filled by a gas; and wherein the container is configured as a pressure-compensated structure having a gas containing region therein that is remote relative to the polygonal reflector, which is fully submerged within the optically transparent liquid.

27. An optical beam steering device for light detection and ranging (LiDAR), comprising:
an at least partially optically transparent container having a polygonal reflector therein that is surrounded on all sides thereof by an optically transparent liquid having an effective density within ±30% of an effective density of the polygonal reflector so that a substantially neutrally buoyant condition is present between the polygonal reflector and the optically transparent liquid within the container.

28. The device of claim 27, wherein the optically transparent liquid is a Fluorinert liquid.

29. The device of claim 12, wherein the optically transparent liquid is a Fluorinert liquid.

30. The device of claim 18, wherein the optically transparent fluid comprises Fluorinert.

* * * * *